United States Patent [19]
Webb

[11] 3,828,251
[45] Aug. 6, 1974

[54] PORTABLE MICROWAVE RADIATION SENSING AND MEASURING DEVICE

[75] Inventor: Robert F. Webb, Louisville, Ky.

[73] Assignee: General Electric Company, Louisville, Ky.

[22] Filed: Oct. 23, 1973

[21] Appl. No.: 408,444

Related U.S. Application Data

[63] Continuation of Ser. No. 252,626, May 12, 1972, abandoned.

[52] U.S. Cl. .................. 324/72, 324/95, 325/363, 343/703
[51] Int. Cl. .......................................... G01r 23/04
[58] Field of Search ............... 324/72, 95; 325/363; 343/703

[56] References Cited
UNITED STATES PATENTS

| | | | |
|---|---|---|---|
| 3,109,988 | 11/1963 | Hoover | 324/95 X |
| 3,360,726 | 12/1967 | Peters, Jr. | 324/95 X |
| 3,641,439 | 2/1972 | Adan | 324/106 X |
| 3,691,459 | 9/1972 | Anderson | 324/95 |

OTHER PUBLICATIONS

Agnew J., "A Low Cost Microwave Field Strength Meter" The Electronic Engineer, Vol. 29, No. 12, Dec. 1970, pg. 60.

Primary Examiner—Alfred E. Smith
Assistant Examiner—Rolf Hille
Attorney, Agent, or Firm—Richard L. Caslin; Francis H. Boos

[57] ABSTRACT

A portable device for sensing and measuring microwave energy includes an RF diode to sense the electric field of the microwaves and to convert it into direct current which is readily measured and indicated by a current meter. The device also includes a metal radiation shield interposed between the detector diode and the meter to insure that the current measured is due only to that microwave energy incident upon the diode. The diode is mounted within a radiation permeable protective casing which is shaped so as to locate the detector diode at a uniformly fixed distance and orientation with respect to the surface being measured for radiation leakage. The case may also be adapted to accept an elongated handle so that measurements may be made without placing the operator in the field of any possible leakage of radiation.

3 Claims, 5 Drawing Figures

PATENTED AUG 6 1974  3,828,251

PORTABLE MICROWAVE RADIATION SENSING AND MEASURING DEVICE

This is a continuation of application, Ser. No. 252,626 filed May 12, 1972, now abandoned.

BACKGROUND OF THE INVENTION

The present invention relates to a device for sensing and measuring microwave radiation emanating from a surface and is particularly adaptable for use in sensing radiation leakage around a microwave oven door seal.

Manufacturers of electronic microwave ovens take extreme care in the design of the oven to insure the safety of the user against leakage of microwave radiation, particularly around the door seal. However, despite the precautions taken by the manufacturer, it is sometimes possible for an oven to become leaky during the normal lifetime of the oven due to aging of the door seal gasket or due to accumulation of spilled food particles on the door seal. For the safety of the user, the Department of Health, Education and Welfare/Bureau of Radiological Health regulations specify that the maximum allowable leakage from any oven surface, for other than in-factory measurements, is 5 milliwatts per square centimeter measured 5 centimeters from any oven surface.

There is a need, therefore, for a fairly simple and accurate device to sense radiation leakage occurring at this low level and to give a reliable reading of its intensity. Devices for this purpose presently available are of two general types: thermal and electrical. The thermal type of device electrically measures a change in the temperature produced in a thermally sensitive element such as a thermistor or a thermocouple exposed to the microwave radiation field. The electrical type employs an antenna which senses the radiation and converts it into high frequency current which is then rectified and measured as direct current by a current meter. Each of these two types of devices requires an antenna to sense the microwave energy converting it into RF currents which can then be detected and measured by fairly sophisticated circuitry, but even with a perfectly balanced antenna system that feeds an indicating device by wires or cable, it is difficult to eliminate erroneous readings due to unwanted pickup in those wires. One device using such wire connections is the Microdek 310 produced by the International Crystal Manufacturing Company, Oklahoma City, Oklahoma. A similar application is described in copending application, Ser. No. 134,142, filed Apr. 15, 1971 by Charles L. Andrews and assigned to the same assignee as the present invention.

The checking of microwave ovens door seals for leakage is often done in the field by a service repairman or technician. For such an application, the comparative ease of use and measuring, as well as the ruggedness of such a device, are important criteria. Many of the available devices require an external power source or a battery for their operation and typically cost in excess of $800.00 per device. Some also provide a fairly delicate probe to be inserted into the microwave field to be measured.

Therefore a device suitable for sensing and measuring leakage of microwave radiation from an electronic microwave oven door seal should: (1) sense microwave energy as low as 1 milliwatt per square centimeter measured a distance of 5 centimeters from any surface of such an oven; (2) yield a reading that is repeatable within ± 2 milliwatts per square centimeter as compared with a known standard; and (3) be rugged, self-contained and inexpensive as compared with those devices presently available.

It is an object of the present invention to provide a microwave radiation sensing and measuring device that is self-contained and needs no external power source for its operation and is rugged and inexpensive as compared with those devices presently available.

SUMMARY OF THE INVENTION

In accordance with the present invention a self-contained portable device for sensing and measuring the electric field strength of microwave radiation emanating from a surface being tested comprises a semiconductor antenna diode and circuit means operatively coupled to the diode for generating a direct current proportional to the electric field strength of the radiation field into which the antenna diode is inserted, the circuit including indicator means responsive to the direct current for providing an indication of the strength of the sensed field. The device further includes a radiation shield interposed between the diode and the circuit means to isolate the circuit means from the microwave field encountered by the diode. The device still further includes an enclosure in which the foregoing elements are mounted to form a unitary package, the enclosure having a radiation permeable extension encompassing the diode and being so formed as to provide a predetermined spacing and orientation of the diode with respect to the test surface.

DESCRIPTION OF THE PREFERRED EMBODIMENT

Figure 1:
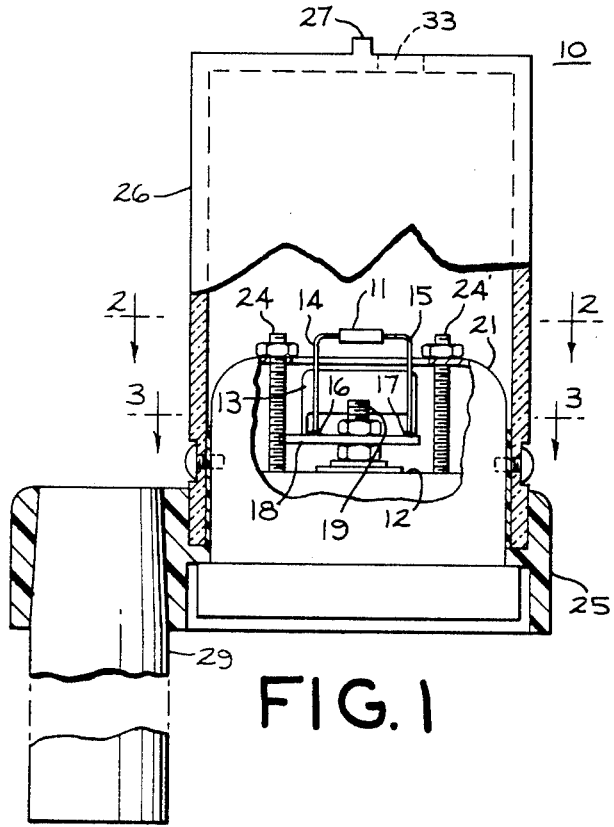
FIG. 1 is a side elevation view, partly in section, of a preferred embodiment of the present invention.
Figure 3:
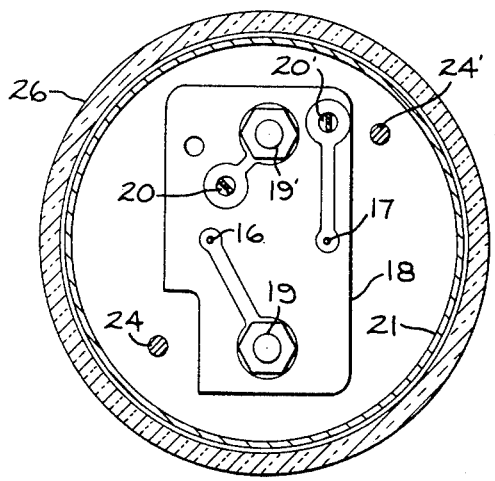
FIG. 3 is an enlarged sectional plan view, taken generally along lines 3—3 of FIG. 1.
Figure 5:
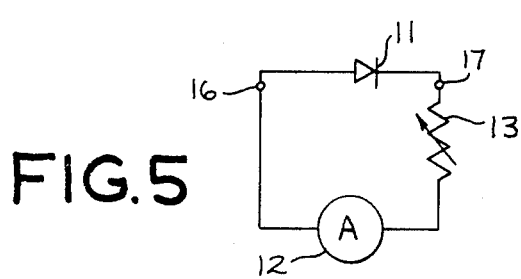
FIG. 5 is a schematic diagram of a circuit useful in the device of FIG. 1.

Referring to FIG. 1 of the drawing, there is shown a self-contained portable device 10 for sensing and measuring the electric field strength of microwave radiation emanating from a surface under test, such as, for example, the door seal of a domestic microwave oven. The device includes a semiconductor antenna diode 11 of the RF type, and circuit means operatively coupled to diode 11 for generating a direct current proportional to the strength of the electric field into which diode 11 is inserted during a leakage test. As schematically shown in FIG. 5, the circuit means comprises a DC milliammeter 12 coupled in series with a variable calibration resistor 13 and diode 11. Referring again to FIG. 1, diode 11 is mounted via leads 14 and 15 to terminal holes 16 and 17 on printed circuit board 18. As shown in FIG. 3, board 18 is mounted directly on the back side of the housing of meter 12 by means of screw mounts 19, 19', which also serve as the necessary electric connections to meter 12. Calibration resistor 13 is similarly mounted on board 18 via terminal holes 20, 20'.

Figure 2:
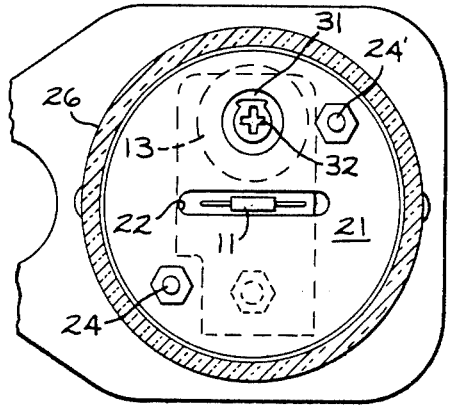
FIG. 2 is a plan view, partly in section, taken generally along line 2—2 of FIG. 1.

A radiation shield consisting of any material suitable for blocking microwave radiation, such as metal shield 21 formed in the shape of a cup, and shown in FIGS. 1 and 2, is interposed between the diode 11 and the circuit means including the meter works, resistor 13, and board 18, to isolate the circuit means from the microwave field encountered by the diode 11. Shield 21 is provided with a slot 23 for allowing diode 11 to protrude therethrough and is attached to the back side of meter housing 12 via mounting screws 24, 24'.

Referring again to FIG. 1, a protective enclosure 25 is fixedly attached to meter housing 12 and forms a unitary package to encompass diode 11, the circuit means and radiation shield 21. Enclosure 25 in part comprises a radiation permeable extension 26 encompassing the diode 11 and is formed so as to provide a predetermined spacing from diode 11 to the test surface, such as the door seal junction of a microwave oven. Extension 26 of enclosure 25 further provides a locator rib 27 for maintaining a fixed orientation of diode 11 relative to the door seal junction as the device 10 is moved along this junction. Enclosure 25 is further adapted to accept an elongated handle 29 such that measurements may be made without placing the operator in the field of any possible leakage of radiation. Referring to FIG. 2, a hole 31 is provided in shield 21 for adjustment of screw 32 of variable resistor 13. Another hole 33 is provided in extension 26 substantially in alignment with hole 31 such that an instrument may be inserted to effect adjustment of resistor 13.

Figure 4:
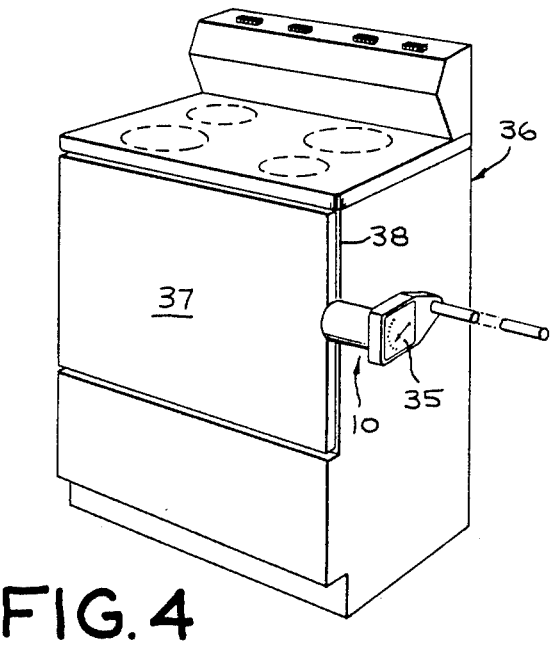
FIG. 4 is a perspective view of a typical electronic oven-range, showing the device of the present invention in place along the door-body seal gap of the oven.

To best understand the operation of this measuring device, refer to FIG. 4 wherein is shown a domestic range 36 which includes an electronic microwave oven 37 operating, for example, at a frequency of 915 MHz. In actual use, the device 10 is hand held so that the antenna diode 11 is in correct relation with respect to the field to be measured. This is accomplished by inserting locating rib 27 into the oven door seal junction 38; the device then may be moved along this junction 38. The electric field of the microwave radiation is sensed and detected by the antenna diode 11 and a direct current is generated in the circuit of the device. The value of direct current generated, here related to the flux-density of the radiation field, will be measured by a meter 12 and will be indicated on the graduated scale 35, which may be calibrated to read in terms of milliwatts per square centimeter.

It will be noted that there is no battery nor external source of power needed; the device is entirely self-contained as shown in the electrical schematic representation of the circuit in FIG. 5.

Since government regulations specify the maximum allowable leakage radiation at a fixed distance, i.e., 5 centimeters from any surface of the oven, spacer extension 26 is incorporated to ensure that measurements are taken uniformly at this fixed distance. The spacing then of diode 11 from the closed end of cylinder 26 is, for this application, designed to be 5 centimeters.

Calibration of the device is accomplished by changing the resistance value of variable resistor 13. The device is inserted into a radiation field of known fixed value and the resistor 13 may be easily adjusted externally by inserting a tool into screw 32 of resistor 13, adjusting it so that the scale 35 reading agrees with the known standard. In this embodiment, the point at which the 5 milliwatt level is calibrated may be arbitrarily chosen to coincide with any point from zero to 75 percent of full meter scale when using, as here, a one milliamp meter as the indicator. Thus, an accurate indication may be realized, eliminating problems of resolution which might arise if calibration were limited to only 10 or 15 percent of full scale.

An important criterion for such a device is that the reading must be repeatable within ± 2 milliwatts per square centimeter as compared with a known standard. To ensure this, metal radiation shield 21 is provided, completely shielding the housing and meter works from the incident radiation. Since stray radiation is prevented from reaching the meter and the circuitry, any indication on the meter scale 35 is due solely to microwave energy incident upon antenna diode 11.

Laboratory tests have shown that the position of the diode 11 with respect to metal shield 21 is important, since too large a distance between the diode and the shield results in poor polarization of the device, while too small a spacing results in loss of sensitivity. Experimentation indicates that the proper range of spacing for use in 915 MHz detection is between three-sixteenths inch and one-fourth inch. It has also been found that leads 16 and 17 of diode 11 should perforate the radiation shielding cup 21 substantially at right angles, as shown in FIG. 1, to ensure repeatability of measurements.

Another criterion, that of ruggedness, has been accomplished by the use of protective enclosure 25, for this application made of styrene, combined with extension 26 which is made of clear polystyrene. This protective enclosure 25 serves to protect diode 11 and to further absorb shock from any possible droppage of the device.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. A self-contained, portable, passive device for sensing and measuring the electric field strength of microwave radiation emanating from a surface under test, comprising:

a semi-conductor diode serving both as a microwave sensing antenna and as a detector such that the diode is arranged to be inserted into the field of the radiation;

circuit means operatively coupled to the diode for conducting an induced current proportional to the strength of the field into which the diode is inserted, the circuit means including indicator means responsive to the direct current for providing an indication of the strength of the field;

a microwave-reflective radiation shield interposed between the diode and the circuit means for isolating the circuit means from the microwave field encountered by the diode;

and a protective enclosure in which the diode, circuit means and shield are mounted, to form a unitary package, the enclosure having a radiation permeable extension encompassing the diode and being so formed as to provide a predetermined spacing and orientation of the diode from the test surface.

2. The device of claim 1 in which the surface under test is the door seal junction of a microwave oven and the form of the enclosure extension provides a predetermined orientation of the diode relative to the door seal as the device is moved along the door seal.

3. A self-contained, portable, passive device for sensing and measuring the electric field strength of microwave radiation emanating from the door seal junction of a microwave oven, comprising:

a semi-conductor RF diode serving both as a microwave sensing antenna and a detector such that the diode is arranged to be inserted into the field of the radiation;

circuit means operatively coupled to the diode for conducting an induced direct current proportional to the strength of the field into which the RF diode is inserted, the circuit means including a current meter responsive to the induced current for providing an indication of the strength of the field, the circuit means further including a variable resistor to effect calibration of the device;

a microwave-reflective radiation shield in the form of an electrically-conductive cup interposed between the diode and the circuit means to isolate the circuit means from the microwave field encountered by the diode;

a protective enclosure in which the diode, circuit means and shield are mounted to form a unitary package, the enclosure having a radiation permeable extension encompassing the diode and being so formed as to have a length adapted to place the diode at a predetermined spacing from the microwave oven surface being measured for radiation leakage, the enclosure further having an elongated rib attached to the end thereof for maintaining a fixed orientation of the diode relative to the microwave oven door seal junction, and the enclosure being further adapted to accept an elongated handle for remotely holding the device so as not to expose the operator thereof to the field of any possible radiation leakage.

* * * * *